(12) United States Patent
Melman et al.

(10) Patent No.: US 7,933,268 B1
(45) Date of Patent: Apr. 26, 2011

(54) IP MULTICAST FORWARDING IN MAC BRIDGES

(75) Inventors: David Melman, Hakerem (IL); Tsahi Daniel, Tel-Aviv (IL); Lior Valency, Yahud (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 783 days.

(21) Appl. No.: 11/376,428

(22) Filed: Mar. 14, 2006

(51) Int. Cl.
*H04L 12/28* (2006.01)
*H04L 12/56* (2006.01)

(52) U.S. Cl. ........ 370/389; 370/245; 370/260; 370/338; 370/356; 370/401; 709/206; 709/220; 709/227; 709/237

(58) Field of Classification Search .................. 370/338, 370/352, 356, 390, 432; 709/245
See application file for complete search history.

(56) References Cited

U.S. PATENT DOCUMENTS

| | | | |
|---|---|---|---|
| 6,269,404 B1* | 7/2001 | Hart et al. | 709/238 |
| 6,337,862 B1* | 1/2002 | O'Callaghan et al. | 370/392 |
| 6,553,028 B1* | 4/2003 | Tang et al. | 370/389 |
| 6,711,163 B1* | 3/2004 | Reid et al. | 370/390 |
| 7,397,811 B2* | 7/2008 | Green | 370/432 |
| 7,408,910 B2* | 8/2008 | Kimata et al. | 370/338 |
| 2002/0159461 A1* | 10/2002 | Hamamoto et al. | 370/392 |
| 2003/0072300 A1* | 4/2003 | Kwon | 370/352 |
| 2003/0072301 A1* | 4/2003 | Ko | 370/352 |
| 2004/0158872 A1* | 8/2004 | Kobayashi | 725/120 |
| 2005/0076145 A1* | 4/2005 | Ben-Zvi et al. | 709/245 |
| 2005/0120378 A1* | 6/2005 | Jalonen | 725/97 |
| 2005/0190747 A1* | 9/2005 | Sindhwani et al. | 370/352 |
| 2006/0023733 A1* | 2/2006 | Shimizu et al. | 370/432 |
| 2006/0187900 A1* | 8/2006 | Akbar | 370/352 |
| 2006/0209810 A1* | 9/2006 | Krzyzanowski et al. | 370/356 |
| 2006/0221960 A1* | 10/2006 | Borgione | 370/390 |
| 2007/0115927 A1* | 5/2007 | Pearson | 370/352 |

OTHER PUBLICATIONS

Section One of IEEE Std. 802.3-2002 article entitled "Part 3: Carrier sense multiple access with collision detection (CSMA/CD) assess method and physical layer specifications" © 2002 by the Institute of Electrical and Electronics Engineers, Inc., ISBN 0-7381-3089-3 SS94973, pp. i-xxiv and 1-551.

Section Two of IEEE Std. 802.3-2002 article entitled "Part 3: Carrier sense multiple access with collision detection (CSMA/CD) assess method and physical layer specifications" © 2002 by the Institute of Electrical and Electronics Engineers, Inc., ISBN 0-7381-3089-3 SS94973, pp. 1-581.

Section Three of IEEE Std. 802.3-2002 article entitled "Part 3: Carrier sense multiple access with collision detection (CSMA/CD) assess method and physical layer specifications" © 2002 by the Institute of Electrical and Electronics Engineers, Inc., ISBN 0-7381-3089-3 SS94973, pp. 1-379.

IEEE Std. 802.3ac-1998 article entitled "Supplement to Carrier Sense Multiple Access with Collision Detection (CSMA/CD) Access Method and Physical Layer Specifications—Frame Extensions for Virtual Bridged Local Area Network (VLAN) Tagging on 802.3 Networks" © 1998 by the Institute of Electrical and Electronics Engineers, Inc., ISBN 0-7381-1422-7 SS94675, pp. i-vi and 1-13.

* cited by examiner

*Primary Examiner* — Michael J Moore, Jr.
*Assistant Examiner* — Lonnie Sweet (57) ABSTRACT

The invention provides novel methods of forwarding multicast data packets to selected egress ports in a MAC bridging environment. A multicast data packet is received via an ingress port. A source IP address and a destination multicast IP address are retrieved from the multicast packet. In a forwarding database, different groups of egress ports correspond to different combinations of a source address, a destination multicast address, and a virtual local area network identifier (VLAN-ID). The forwarding database is accessed, based on the retrieved source address, the retrieved destination multicast address, and a VLAN-ID, to thereby determine a corresponding group of egress ports. The multicast packet is then forwarded to the corresponding group of egress ports.

36 Claims, 7 Drawing Sheets

IP MULTICAST FORWARDING IN MAC BRIDGES

FIELD OF THE INVENTION

The present invention relates to computer networking in general, and, in particular, to the forwarding of Multicast packets by Bridges.

BACKGROUND OF THE INVENTION

The amount of Multicast traffic has seen strong increases over the past few years. IP Multicast provides a method of using an Internet Protocol ("IP") address to transport data to multiple destinations using a single IP packet. Multicast is often more efficient than unicast or broadcast for one-to-many delivery of data.

Medium Access Control (MAC) is a protocol that may be used to provide layer 2 transmission functionality. An Ethernet MAC frame may encapsulate higher layer payload data by adding a 14 octet header before the data and appending a 4 octet CRC after the data. The header may include a destination MAC address, which may indicate whether the frame contains multicast traffic.

The deployment of large scale switched Local Area Networks (LANs) has also seen significant recent growth. Switches may forward packets by retrieving the destination MAC address from the MAC header. However, if such a header includes an indication of multicast traffic, the frame may be multicast to more ports on the LAN than necessary, which can overwhelm the network. The IEEE 802.1Q and 802.1D standards define the operation of bridges and methods of MAC switching which provide for bridged Virtual LANs (VLANs). While such standards may alleviate some problems related to multicast flooding, there remains a need in the art for improved methods of switching multicast data traffic.

BRIEF SUMMARY OF THE INVENTION

According to various embodiments of the invention, methods are described for forwarding a multicast data packet to a subset of egress ports. In certain embodiments, a multicast data packet is received, and a source address and a destination multicast address are retrieved from the multicast data packet. A forwarding database (FDB) is accessed to lookup a subset of egress ports, wherein the subset is a group of egress ports which receive multicast data containing the retrieved source address and the retrieved destination multicast address. The multicast data packet is then forwarded to the subset of egress ports.

In a number of embodiments, the multicast data packet is a Medium Access Control (MAC) frame, and a source IP address and the destination multicast IP address are retrieved. In some embodiments, the corresponding group of egress ports comprise a Virtual Local Area Network (VLAN). According to certain embodiments, multicast forwarding entries in a FDB are generated based on information from a number of trapped or mirrored messages reporting multicast group information. In some embodiments, the trapped or mirrored messages may include a message reporting IP multicast group membership (e.g., Internet Group Management Protocol (IGMP) or Multicast Listener Discovery (MLD) packets). A source IP address in the forwarding database may, in some embodiments, be set to indicate correspondence with any retrieved source addresses.

In certain embodiments, the source address and destination multicast address in the FDB together are a sixty-four bit field. The sixty-four bit field may be a thirty-two bit IP version 4 (IPv4) source address and a thirty-two bit IPv4 destination multicast address. In other embodiments, it may be a first selection from a 128 bit IP version 6 (IPv6) source address and a second selection from a 128 bit IPv6 destination multicast address. In some embodiments, the four octets to be selected from the 128 bit IPv6 source address and the four octets to be selected from the 128 bit IPv6 destination multicast address are configurable.

In a variety of embodiments, an apparatus is described which is configured to perform the methods described above. Such an apparatus may, for example, comprise a switch or bridge. In some embodiments, the apparatus comprises a forwarding database memory, an ingress unit, a retrieval unit, an access unit, and an egress unit. Such an apparatus may comprise a single integrated circuit.

According to one embodiment of the invention, a device is configured with means to receive an IP multicast data packet. The device includes means to retrieve an IP source address and an IP destination multicast address. There are means to access a forwarding database to lookup a subset of egress ports, wherein the subset is a group of egress ports which receive multicast data containing the retrieved IP source address and the retrieved IP destination multicast address. The device is also configured with means to forward the multicast data packet to the subset of egress ports.

In a number of embodiments, a device may be configured with means to receive a MAC frame, or other layer 2 packet. In some embodiments, the device is configured with means to forward a data packet to a specific VLAN. According to some embodiments, an FDB is configured with means to trap or mirror messages reporting multicast group information (e.g., IGMP or MLD packets). The FDB may be configured with means to create the FDB based on information from the trapped report messages reporting multicast group information.

According to one embodiment of the invention, a device is configured with code to receive an IP multicast data packet, and code to retrieve an IP source address and an IP destination multicast address. There is code to access a forwarding database to lookup a subset of egress ports, wherein the subset is a group of egress ports which receive multicast data containing the retrieved IP source address and the retrieved IP destination multicast address. The device is also configured with code to forward the multicast data packet to the subset of egress ports.

In a number of embodiments, a device may be configured with code to receive a MAC frame, or other layer 2 packet. In some embodiments, the device may be configured with code to forward a data packet to a specific VLAN. According to some embodiments, an FDB is configured with code to trap or mirror messages reporting multicast group information (e.g., IGMP or MLD packets). The FDB may be configured with code to create the FDB based on information from the trapped report messages reporting multicast group information.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention as set forth in the appended claims.

Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

It should also be appreciated that the following systems, methods, and software may be a component of a larger system, wherein other procedures may take precedence over or otherwise modify their application. Also, a number of steps may be required before, after, or concurrently with the following embodiments.

I. OVERVIEW

The invention provides novel methods of forwarding multicast data packets to selected egress ports. According to various embodiments of the invention, an IP multicast data packet is received via an ingress port. A source IP address and a destination multicast IP address are directly retrieved from the multicast packet. In a forwarding database, different groups of egress ports correspond to different pairwise combinations of a source IP address and a destination multicast IP address. The forwarding database is accessed to lookup the retrieved source IP address and the retrieved destination multicast IP address to thereby determine a corresponding group of egress ports. The multicast packet is then be forwarded to the corresponding group of egress ports.

II. EXEMPLARY DEVICE STRUCTURE

Figure 1:
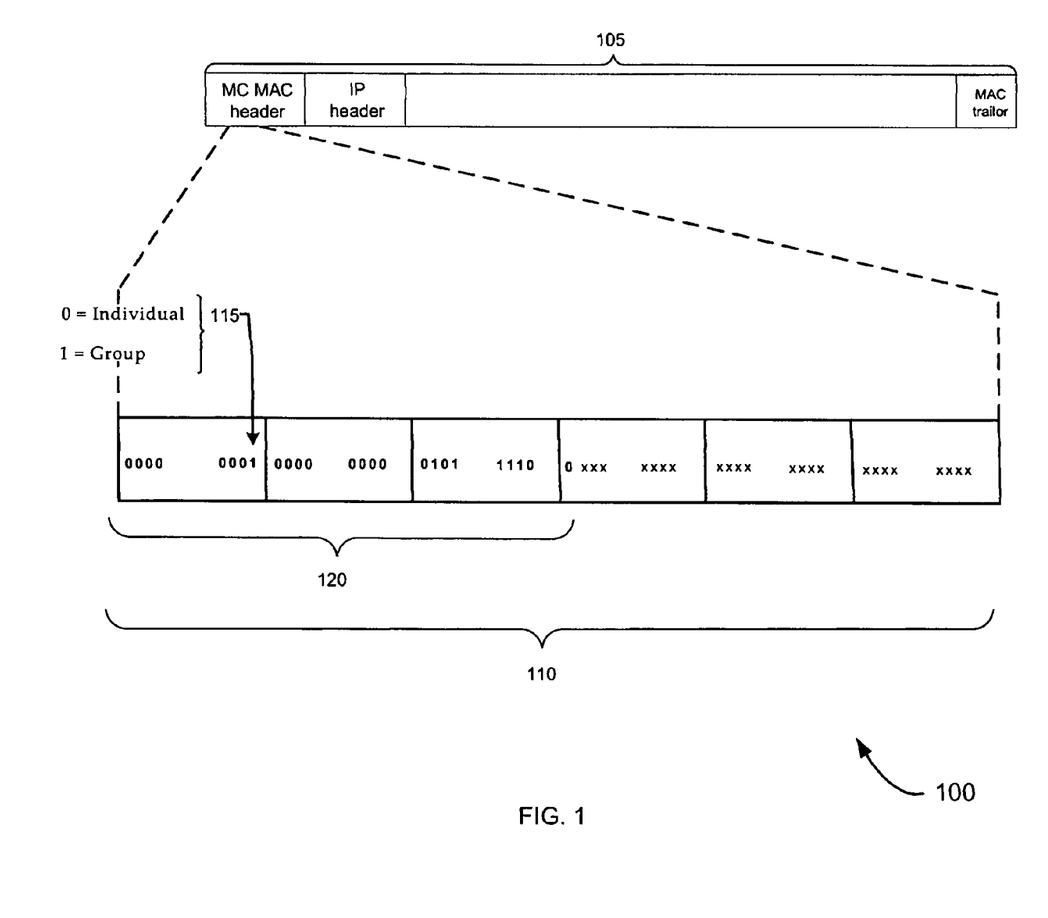
FIG. 1 illustrates a Multicast MAC frame which may be forwarded according to various embodiments of the present invention.

FIG. 1 illustrates an example 100 of a data packet received according to various embodiments of the invention. The exemplary data packet comprises a multicast MAC frame 105. The MAC header is comprised of MAC destination address, a MAC source address, and MAC Ethertype/Length. The MAC destination address includes a multicast destination address. The IP Header within the MAC frame includes a multicast destination IP address The exploded 6 octets 110 represent the MAC multicast destination address, which comprise the first 6 octets of the MAC header. In other embodiments, the data packet may comprise other Layer 2 (i.e., Data Link layer) packets. Reference numeral 115 shows the bit in the exemplary MAC destination address which indicates that the frame is to be multicast. In other embodiments, there may be other indicators that a given data packet or MAC frame will be multicast. In most IP multicast MAC frames today, the first 25 bits (illustrated by reference numeral 120) are static.

Figure 2:
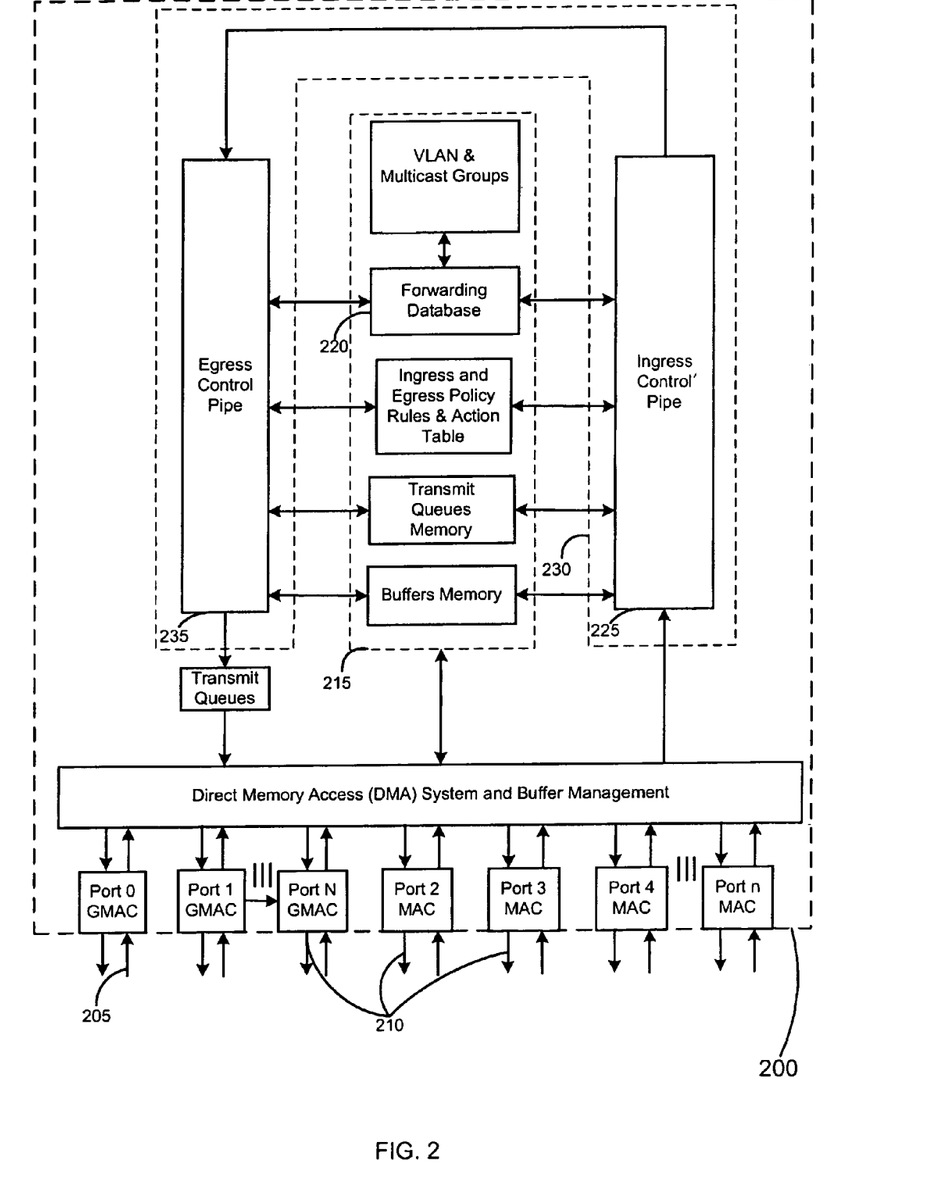
FIG. 2 is a simplified block diagram illustrating an apparatus according to various embodiments of the present invention.

FIG. 2 illustrates an exemplary structure for a device 200 according to various embodiments of the invention. The device 200 may comprise a single integrated circuit, or the components may comprise more than one chip. In some embodiments, the device comprises a single Application Specific Integrated Circuit (ASIC). In other embodiments, other types of integrated circuits may be used, which may be programmed in any manner known in the art. A multicast MAC packet 105 is received via an input port 205. A Direct Memory Access (DMA) system then receives the packet, and stores at least a portion of the packet in a memory region 215. In some embodiments, a memory region 215 is made up of more than one memory region, on more than one chip. Those skilled in the art will recognize the different memory configurations available. The memory region 215 may be made up of Transmit Queues Memory, Buffers Memory, VLAN and Multicast Groups information, a Forwarding Database 220, and Ingress and Egress Policy Rules. A number of these functions will be discussed in greater detail below.

In some embodiments, a processing pipeline 230 performs processing operations on a received packet. The processing pipeline in this embodiment includes an Ingress Control Pipe 225 and an Egress Control Pipe 235. Components of the processing pipeline 230 process and modify the packet, and may specifically select the individual egress ports 210 to which the packet may be forwarded. Thus, for example, instead of flooding a multicast packets to all ports in bridge, the processing pipeline may limit the forwarding to only those ports which have devices on them which want to receive the packet.

Figure 3:
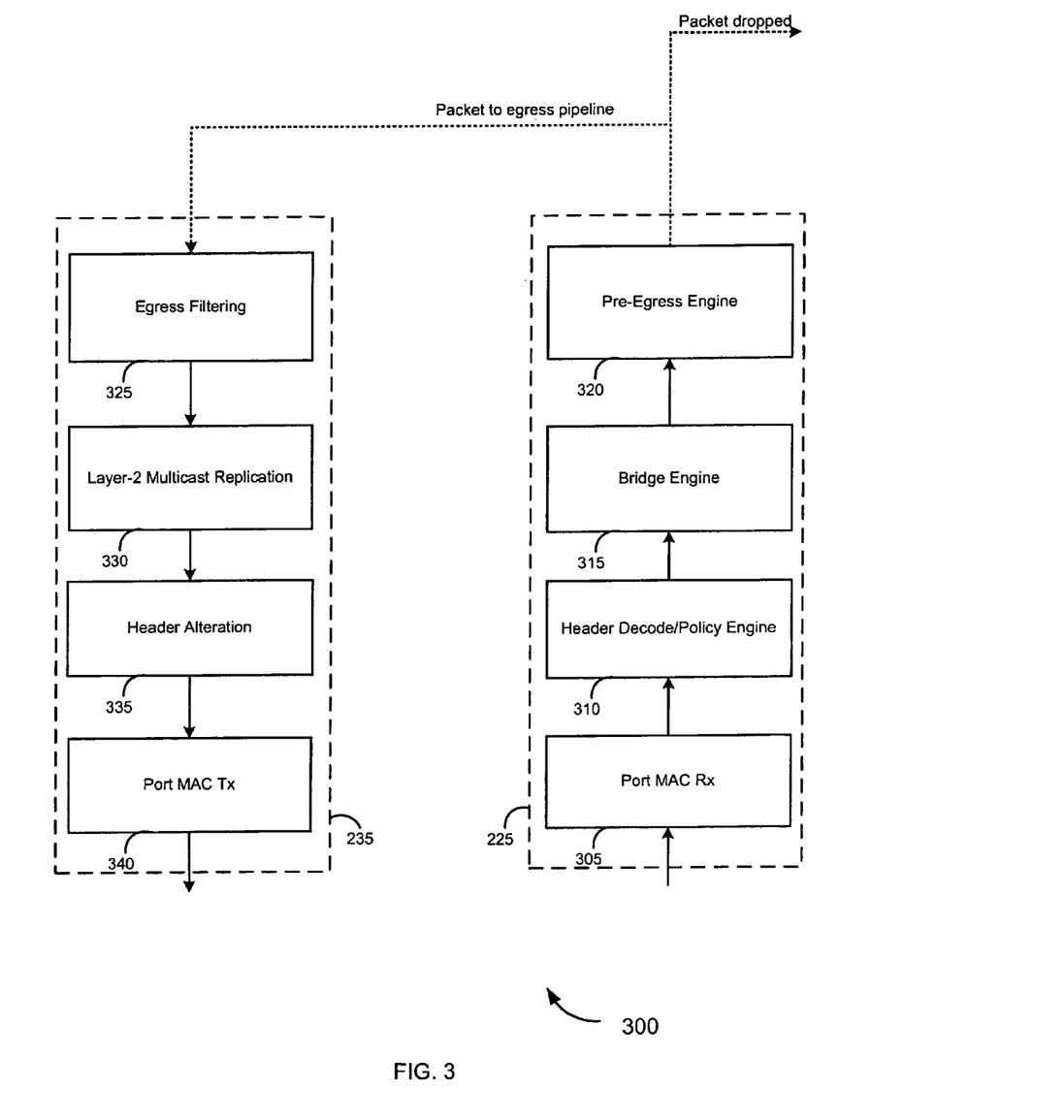
FIG. 3 is a simplified high-level block diagram illustrating Ingress Control Pipe and Egress Control Pipe according to various embodiments of the present invention.

FIG. 3 illustrates an exemplary embodiment 300 of a processing pipeline according to various embodiments of the invention. The dashed area in FIG. 3 designated by reference numeral 225 indicates the components and functionality of the Ingress Control Pipe. There are a number of Port MAC Rx 305, which may each operate independently. The Port MAC Rx 305 is responsible for packet reception, IEEE 802.3 MAC functionality, allocation of buffers in the device's packet memory, and DMA of the packet data into the buffers memory. Packets that contain errors such as Frame Check Sequence ("FCS") Errors, Length Errors, etc. may be flagged to be discarded.

Proceeding through the ingress pipeline 225, a Header Decode/Policy Engine 310 (which may comprise one or more distinct processing engines) decodes the packet's header. This engine extracts the packet fields (e.g., VLAN-ID; MAC Source Address, MAC Destination Address, Source IP Address, Destination IP Address) that are used by the subsequent pipe engines. Next, the Bridge Engine 315 is responsible for a variety of functions. The Bridge Engine 315 controls the IEEE 802.1 bridging, including functions such as VLAN assignment, MAC learning, and forwarding database (FDB) lookups. The Bridge Engine 315 also performs functions related to IPv4 IGMP snooping and IPv6 MLD snooping, and uses the trapped or mirrored messages to build the Forwarding Database (FDB). The Bridge Engine 315 performs packet trapping and mirroring to the CPU, and identifies Layer 2 Multicast, IPv4/v6 Multicast, IGMP and MLD packets. This Bridge Engine 315 functionality will be discussed in more detail below. A Pre-Engress Engine 320 then examines the decisions made in the ingress pipeline, and prepares the packet descriptor for the egress pipeline processing. Depending on these decisions, the packet is forwarded to the egress pipeline, or discarded.

In FIG. 3, the dashed area designated by reference numeral 235 indicates the components and functionality of an exemplary Egress Control Pipe. An Egress Filtering Unit 325 performs a number of functions prior to enqueueing a packet on a given egress port queue. The Egress Filtering Unit 325 filters on a per port basis for a Virtual Local Area Network (VLAN) identifier, performs egress filtering for multi-target packets, and performs source or destination multicast IP filtering. A Layer 2 Multicast Replication Unit 330 is configured to replicate the descriptor for each multicast packet for each egress port member of the group.

A Header Alteration Unit 335 performs a number of functions. When a packet is read from buffers memory, its header may be altered according to its descriptor content and the type of ports from which it is being sent (although it is worth that the MAC destination address and MAC source address are not modified when forwarded by a bridge). For example, the VLAN may be set according to the next-hop VLAN configuration, and a VLAN Tag Header may be added, removed, or modified. After the packet has been read from the buffers memory, it is transmitted via the Port MAC Tx 340, which performs the MAC IEEE 802.3 functionality. In different embodiments of the invention, different components perform the above functions. For example, a general purpose processor may be configured with this functionality. Alternatively, the processing pipeline may be embodied on an Application Specific Integrated Circuit (ASIC), which may be programmed with Very High Speed Integrated Circuit Hardware Description Language (VHDL). Moreover, these functions may be performed in a different order, and one or more steps may be added, dropped, or otherwise modified.

III. BRIDGING FUNCTIONALITY

Figure 4:
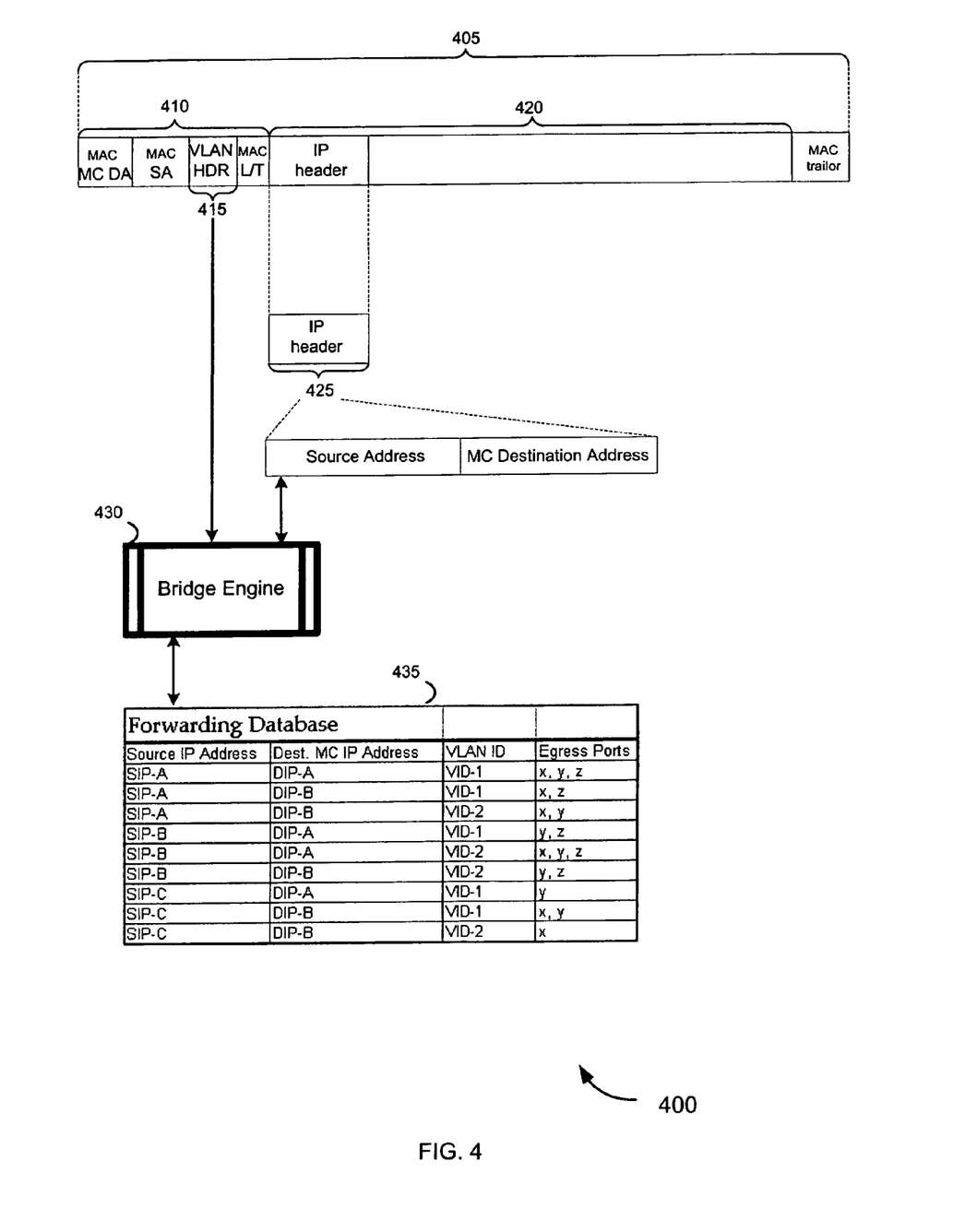
FIG. 4 is a simplified block diagram illustrating the functionality of the Bridge Engine according to various embodiments of the present invention.

FIG. 4 illustrates a process 400 which may be undertaken according to various exemplary embodiments of the invention. The process may be undertaken according to standards set forth in the IEEE 802.1Q standard related to MAC Bridging. After the packet is received, it is be stored in a memory region as directed by the DMA system. This function is accomplished by the Port MAC RX 305.

A. VLAN Header: Reference numeral 405 identifies MAC frame received according to certain embodiments of the invention, wherein a MAC header 410 includes a VLAN header 415. A device may be configured to receive a packet formatted according to a variety of standards (e.g., IEEE 802.1Q and 802.3ac) which include the definition of a VLAN frame format that is able to carry VLAN identification information over Ethernet. This additional information is carried in an additional header field. IEEE 802.1Q is the standard mechanism used today to partition a single Layer 2 bridging domain into multiple, separate, independent bridging domains. Conceptually, each VLAN constitutes a bridged network. VLANs are used to reduce Multicast flooding to relevant ports only. It is expected that VLAN header formats may change as technology evolves, and that these embodiments are merely exemplary in nature.

Certain embodiments of the invention are configured to receive packets that have the VLAN header 415, as well as those without such a header. Packets received on a port may be identified as including VLAN header 415. This identification, in some embodiments, is performed by the Header Decode/Policy Engine 310. However, in other embodiments, other components may provide this functionality. When a frame is received that includes a VLAN header 415 with a VLAN identifier (VLAN-ID), the VLAN-ID may be passed to the Bridge Engine 430. When a frame is received that does not include an applicable or otherwise valid VLAN-ID, a VLAN ID may be assigned by the Bridge Engine 430 before the Forwarding Database 435 in accessed.

Therefore, received packets have VLAN ID assigned, if at all, before processing by the Bridge Engine 315. VLAN IDs may be assigned which are port-based, protocol-based, policy-based, or any combination thereof. Thus, when a packet is received, it may be assigned a VLAN ID which can filter a packet limiting it to certain egress ports. Thus, each port may be associated, or filtered, according to certain VLAN IDs, other VLAN identifiers, and specified protocols.

B. Forwarding Database (FDB): The Bridge Engine 430 lookup functionality is performed after VLAN ID assignment has been made. The Bridge Engine 430 examines the MAC header 410 (specifically, the destination MAC address) to determine whether the frame includes an IP multicast frame, as illustrated in FIG. 1. In other embodiments, there are any number of methods known in the art to examine a data packet to determine if that packet comprises a multicast frame. If a MAC header, or other data in the packet, indicates that it is a multicast packet, embodiments of the invention limit the flooding to only certain ports based on information contained in the packet. In this exemplary embodiment, this functionality is be accomplished by the Bridge Engine 430 in conjunction with the Bridge Forwarding Database (FDB). FDB entries may be categorized as FDB Multicast entries. Unicast entries are also be used in forwarding, but will not be discussed further herein. The FDB provides bridging based on the following entries individually (or a combination thereof) in the FDB:

(1) Source Address: <FDB-SIP>;
(2) Multicast Destination Address, <FDB-DIP>; and
(3) VLAN-ID: <FDB-VID>.

Each FDB entry, therefore, comprises a specified <FDB-SIP>, <FDB-DIP>, and <FDB-VID> address combination. However, in other embodiments, each FDB entry need not include each of an <FDB-SIP>, <FDB-DIP>, and <FDB-V> entry. Each FDB entry will correspond with any number of egress ports (in the FDB, or VIDX, discussed below). In this way, the FDB may be accessed to match information retrieved from a received data packet with an FDB entry (i.e., <FDB-SIP>, <FDB-DIP>; <FDB-VID>), and the packet forwarded to the corresponding egress ports. The FDB entries may be populated in the manner discussed in greater detail below. It is worth noting that the foregoing combination of information may be identified elsewhere in the art as S, G, and V (i.e., S=Source IP Address; G=Group Multicast IP Address, and V=VLAN), or <SIP>, <DIP>, and <VID>. Although a number of embodiments related specifically to source and destination IP protocols, certain embodiments are applicable to a other protocols as well. However, for purposes of this document, such categories within the FDB may hereinafter be referred to as (<FDB-S>, <FDB-D>, and <FDB-V>).

According to some embodiments, and as illustrated at reference numeral 425, the IP header of a received packet is examined, and the source IP address and destination multicast IP address of the packet are retrieved. Along with an associated VLAN-ID, this retrieved source IP address and retrieved destination multicast IP address are used to match a source IP address (SIP), destination multicast IP address (DIP), and VLAN-ID (VID) in the FDB, and the matching egress ports are selected accordingly. A basic illustration of such functionality is illustrated at reference numeral 435. In some embodiments, only the destination IP address (DIP) is used for the FDB lookup, and a retrieved source IP address field may be disregarded. In such cases, the source IP address of a received packet would not limit the ports to which a packet is forwarded. In one embodiment, the source field (SIP) entry in the FDB may be set to all zeros to indicate that the source address will not limit the egress ports. In some embodiments, the VLAN-ID is not considered in limiting the ports to which to forward the packet. Thus, instead of flooding a multicast packet to all ports of a bridge, different combinations of a source address, a multicast address, and a VLAN-ID of the packet can be compared to the FDB to limit the forwarding only to the interested ports. The manner in which the FDB is populated is discussed below.

In some embodiments, the Bridge Engine 435 is used to query the FDB to match the retrieved VLAN-ID, source IP address, multicast destination IP address. In other embodiments this functionality may be provided with other components. Merely by way of example, the FDB internal memory may be organized as rows, where each row may contain a number of FDB entries. The FDB may be searched using a hash function to calculate the search start-row index, from which point a linear search may be performed to resolve hashing collisions. An entry match may be based on entry type key fields. The key for Multicast entries may be <FDB-S>, <FDB-D>; <FDB-V>, or a combination thereof. There may be a configurable upper limit on the number of FDB rows that may be searched. While the search limit may be configured to be any number of rows, performance may be decreased if the limit is increased.

C. FDB Population: There are a variety of ways that an FDB is populated, according to various embodiments of the invention. An address in the FDB may be added, modified, or removed with any variety of methods known in the art. By way of example, various messaging formats may be used to allow FDB events or queries to be exchanged between the FDB and the CPU. A Bridge Multicast (VIDX) table may be used to complement the FDB, and serve as a direct index to an on-chip Multicast table. Each entry on the Bridge Multicast (VIDX) table may contain a port map (for a given Source address, Destination MC address, VLAN-ID, or combination thereof) of corresponding egress ports for the device.

Internet Group Management Protocol (IGMP) and Multicast Listener Discovery (MLD) are protocols which are used by IPv4 and IPv6 nodes, respectively, to report their multicast group membership to neighboring Multicast routers. A "multicast group," as that term is used herein, may simply comprise a destination IP multicast address. Certain embodiments of the invention make use of packets from such protocols to conserve bandwidth on switch ports. In some embodiments, IGMP and MLD packets are trapped by the CPU to populate the FDB (or VIDX) with specified egress ports that correspond to certain <FDB-S>, <FDB-D>, and <FDB-V> entries. By way of example, the device may "listen in" on an IGMP or MLD conversation between hosts and routers.

When the device (e.g., switch or bridge) hears an JUMP or MLD report from a host for a given multicast group, the device adds the host's port number to the FDB (or VIDX) for that multicast group. And, when the device hears an IGMP or MLD leave message, it removes the host's port from FDB (or VIDX) for that multicast group.

In some embodiments, a device examines IGMPv1/2 and MLDv1 packets, and these packets support join requests to receive traffic for a given destination. This is known as Any-Source Multicast (ASM). IGMPv3 and MLDv2 support join requests for receive traffic for an IP multicast group from a list of source/destination pairs. This is known as Source-Specific Multicast (SSM). A further discussion of the particulars of the use of IGMP and MLD in embodiments of the invention is undertaken below. In some embodiments of the invention, packets from other protocols which advertise multicast group membership for hosts, routers, or any other nodes are trapped to populate the FDB or VIDX.

As addressed above, the FDB lookup may be based on the retrieved packet source IP, destination IP group address, and the VLAN-ID. Certain exemplary embodiments providing for the FDB lookup of IP packets will now be explored further. In some embodiments, IPv4/6 Multicast bridging is enabled on a per-VLAN basis. The FDB is populated based on IGMP/MLD report messages trapped or mirrored to the CPU. The CPU configures a Multicast Bridging (VIDX) table entry with the appropriate port membership, and then configures an FDB IPv4 or IPv6 Multicast entry (i.e., source IP address, destination MC IP address, and VLAN-ID) associated with the VIDX index for this group. If the IPv4/6 Multicast mode is (destination MC IP address+VLAN-ID only), the FDB source address field is set to 0.

In certain embodiments, the <FDB-S> and <FDB-D> lookups are each 32-bit fields. In other embodiments, the <FDB-S> and <FDB-D> lookups may be of different sizes, and may be configurable. However, the following explanation relates to two 32-bit fields. For IPv4 Multicast bridging, the full IPv4 address (which is 32-bits) is used for the <FDB-S> match lookup, and for the <FDB-D> match lookup.

In various embodiments for IPv6 (which uses a 128-bit address size), four octets are selected from the IPv6 address, to be used for the FDB match lookup. The IPv6 selected octets used for the <FDB-S> and <FDB-D> match lookup may, in some embodiments, be configured globally. For each IPv6 address, four of the sixteen octets in the IPv6 address are configurable. The IPv6<FDB-S> source default octet selection is octets 15, 14, 13, and 10 (where octet 15 is the IP address least significant octet). In cases where the IPv6 source address is derived from the node's MAC Address, then these octets include the four least significant octets of the node's MAC Address. This four octet selection provides a very high probability of uniqueness. The IPv6<FDB-D> destination default octet selection may be octets 15, 14, 13, and 12. This corresponds to the least significant octets of the IPv6 group address. Note that, according to RFC 3307—IP Multicast Allocation Guidelines, the IPv6 group address (i.e., multicast destination) allocations are from the least significant 32-bit range of the 128-bit group ID. Based on this assumption, the selection of the least significant four octets provides an exact match of the group address. In the event that multiple IPv6 Multicast flows collide to the same FDB entry due to the fact that only 32 of the 128 bits are represented, the entry's associated VIDX group may be configured with a superset of the port members for all the colliding IPv6 Multicast flows.

1. IGMP Use in FDB Population: IGMP is a protocol that may be used by IPv4 systems to report their IP Multicast group membership to neighboring Multicast routers. There are three IGMP message types:

Query messages: Sent by routers to hosts
Report messages: Sent by hosts/routers to routers
Leave messages (IGMPv2 only): Sent by hosts to routers
IGMP packets are, in some embodiments, trapped or mirrored to the CPU for applications of IGMP snooping in switches.

In some embodiments of the invention, IGMP trapping may be enabled on a per port basis. This mechanism traps all IGMP packets to the CPU. Alternatively, IGMP trapping/mirroring may be enabled or disabled per VLAN interface, where the behavior is defined according to a globally configurable IGMP trapping/mirroring mode. Different modes to be defined include:

Mode 1 Trap all IGMP message types (IPv4 protocol=2); and
Mode 2 IGMP Snoop mode. Mirror to CPU Query messages (IPv4 protocol=2 and IGMP Message Type=0x11) and Trap to CPU non-Query IGMP messages (IPv4 protocol=2 and IGMP Message Type !=0x11).

2. MLD Use in FDB Population: MLD is the IPv6 protocol equivalent of IPv4 IGMP. MLDv1 is based on IGMPv2, while MLDv2 is based on IGMPv3. MLD is transported in IPv6 ICMP packets, and MLD packets can be identified by the ICMPv6 message type. Trapping or mirroring of ICMPv6 multicast packets may be enabled on a per-VLAN basis. In some embodiments, a global ICMPv6 table allows for trapping or mirroring up to eight ICMPv6 message types. If the packet is trapped or mirrored to the CPU, it may be assigned a specific CPU code.

D. Egress Processing: Once a Bridge Engine 430 has queried the FDB to lookup a retrieved source and destination multicast group, the Bridge Engine 430 determines the subset of egress ports to which the received packet shall be forwarded. Referring back to the exemplary pipeline of FIG. 3, the Pre-Engress Engine 320 examines the decisions made in the Bridge Engine, and prepares the packet descriptor for the egress pipeline processing. The Egress Filtering Unit 325 filters the packet on a per port basis for a Virtual Local Area Network (VLAN) identifier, and performs source and destination multicast IP filtering. A Layer 2 Multicast Replication Unit 330 replicates the descriptor for the packet for each egress port member of the group. The Header Alteration Unit 335 may alter the packet header, depending on its descriptor content and the type of ports from which it is being sent. In some embodiments, the VLAN is set according to the next-hop VLAN configuration, and a VLAN Tag Header may be added, removed, or modified. After the packet has been read from the buffers memory and its header has been altered, it is transmitted via the Port MAC Tx 340.

IV. EXEMPLARY EMBODIMENTS

Figure 5:
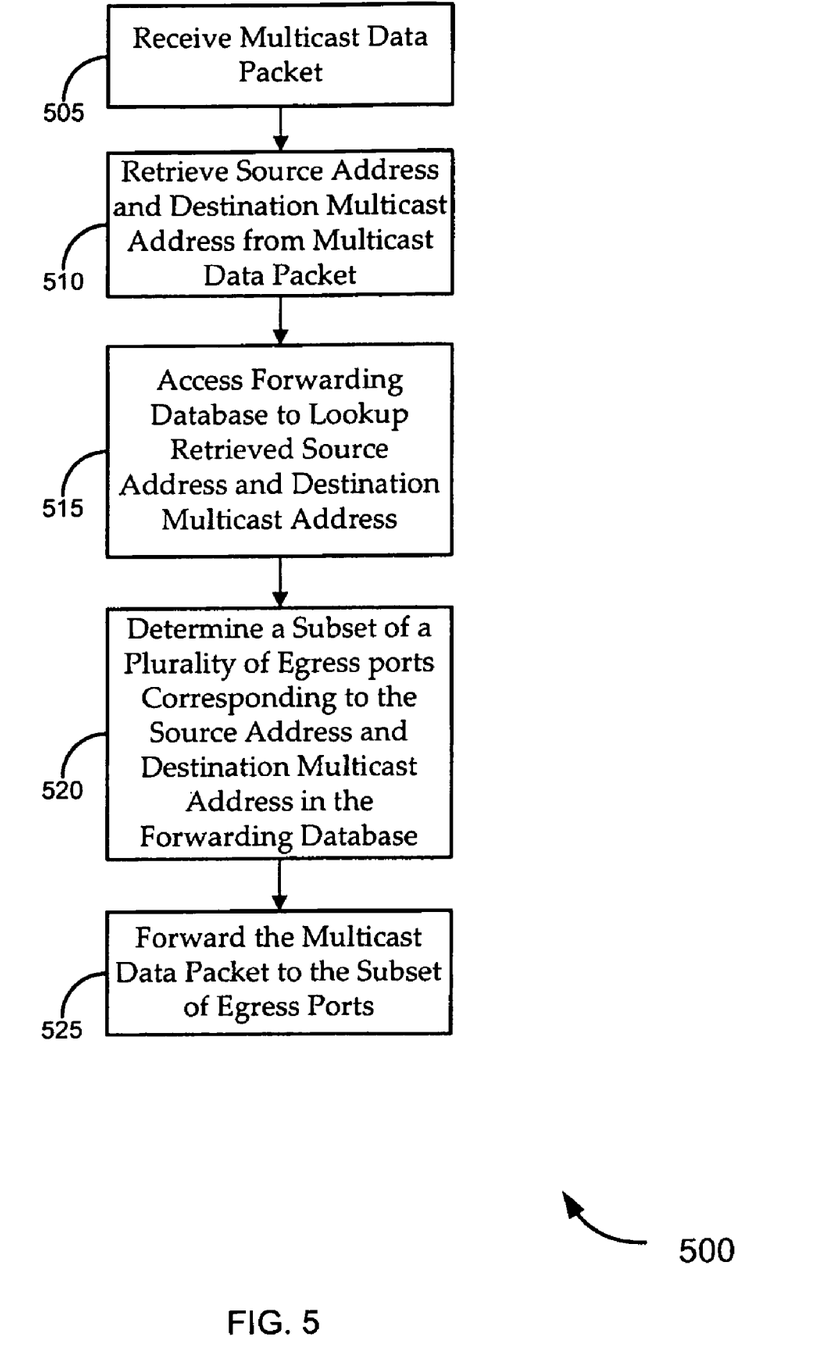
FIG. 5 illustrates a method of forwarding a multicast data packet according to various embodiments of the present invention.

FIG. 5 sets forth a first exemplary embodiment 500 of the invention, illustrating an example of a method for forwarding a received multicast data packet to a subset of egress ports. According to certain embodiments of the invention, a multicast data packet is received via an ingress port at block 505. A source address and a destination multicast address are directly retrieved, at block 510, from the multicast data packet. At block 515, a forwarding database is accessed to lookup the retrieved source address and retrieved destination multicast address. At block 520, a subset of a plurality of egress ports are determined, the subset corresponding to the pairwise combination of the retrieved source address and retrieved destination multicast addresses in the forwarding database. At block 525, the multicast data packet is then be forwarded to the corresponding group of egress ports.

Figure 6:
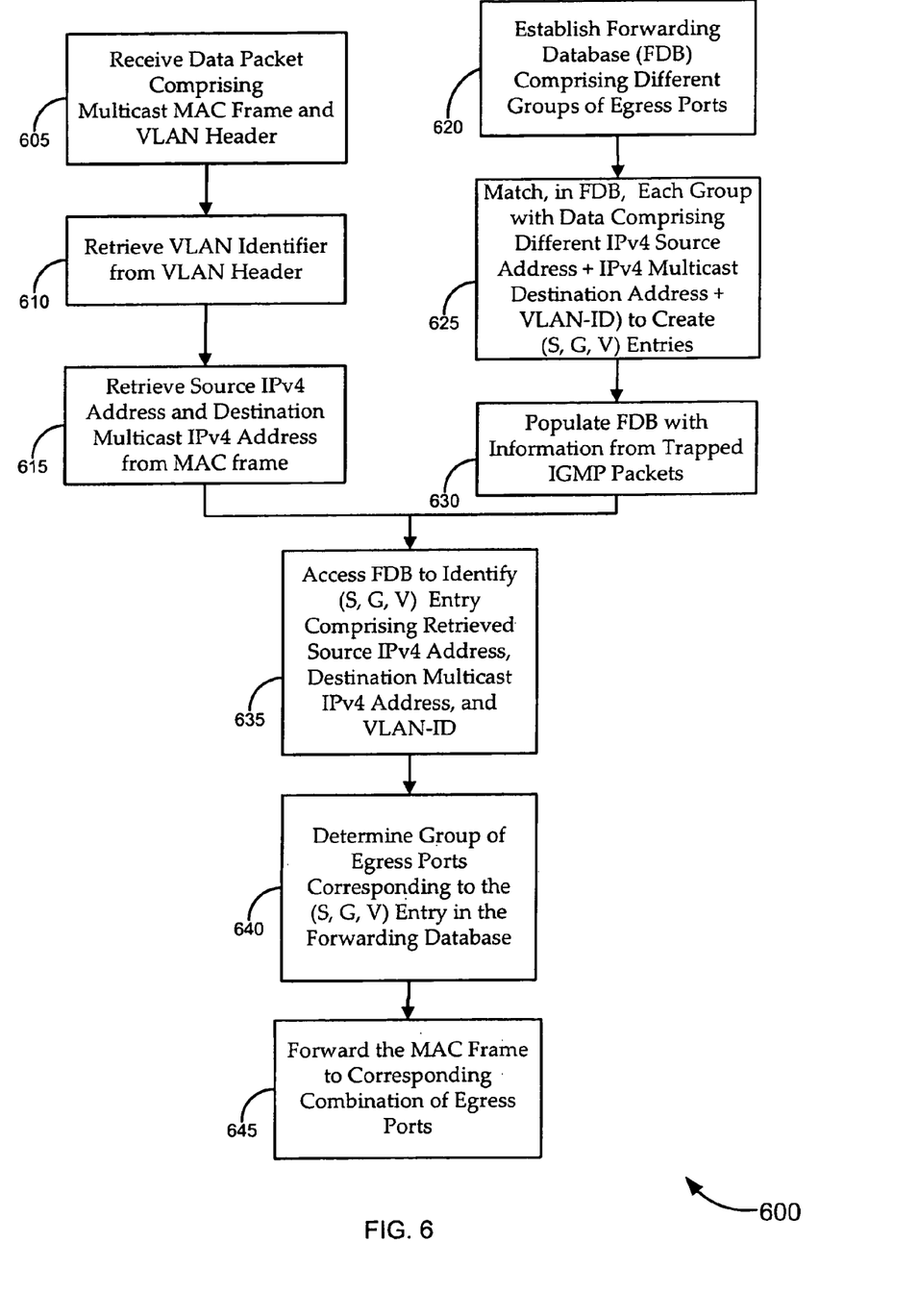
FIG. 6 illustrates a method of forwarding a multicast MAC frame according to various embodiments of the present invention.

FIG. 6 sets forth another exemplary embodiment 600 of the invention, illustrating an alternative method of forwarding a received multicast data packet to a subset of egress ports. At block 605, a data packet is received, comprising a Multicast MAC Frame including a VLAN header. At block 610, the VLAN Identifier is retrieved from the MAC frame. At block 615, the source IPv4 address and destination Multicast IPv4 address is retrieved from the MAC frame.

At block 620, a forwarding database is established comprising different groups of egress ports. In this embodiment, it is worth noting that the creation of FDB entries is done asynchronously, and in not part of the data path flow. Each group of egress ports may be matched, at block 625, with a different combination of IPv4 source address, IPv4 multicast destination addresses, and VLAN-IDs (i.e., an (S, G, V) entry). At block 630, the forwarding database is populated with additional information from trapped IGMP packets.

At block 635, the forwarding database is accessed to lookup the retrieved source IPv4 address, retrieved destination multicast IPv4 address, and retrieved VLAN-ID (i.e., identify an (S, G, V) entry associated with the received MAC frame). Based on the lookup, at block 640 a combination of egress ports is determined which correspond to the (S, G, V) entry looked up in the forwarding database. At block 645, the MAC frame is forwarded to the determined combination of egress ports.

Figure 7:
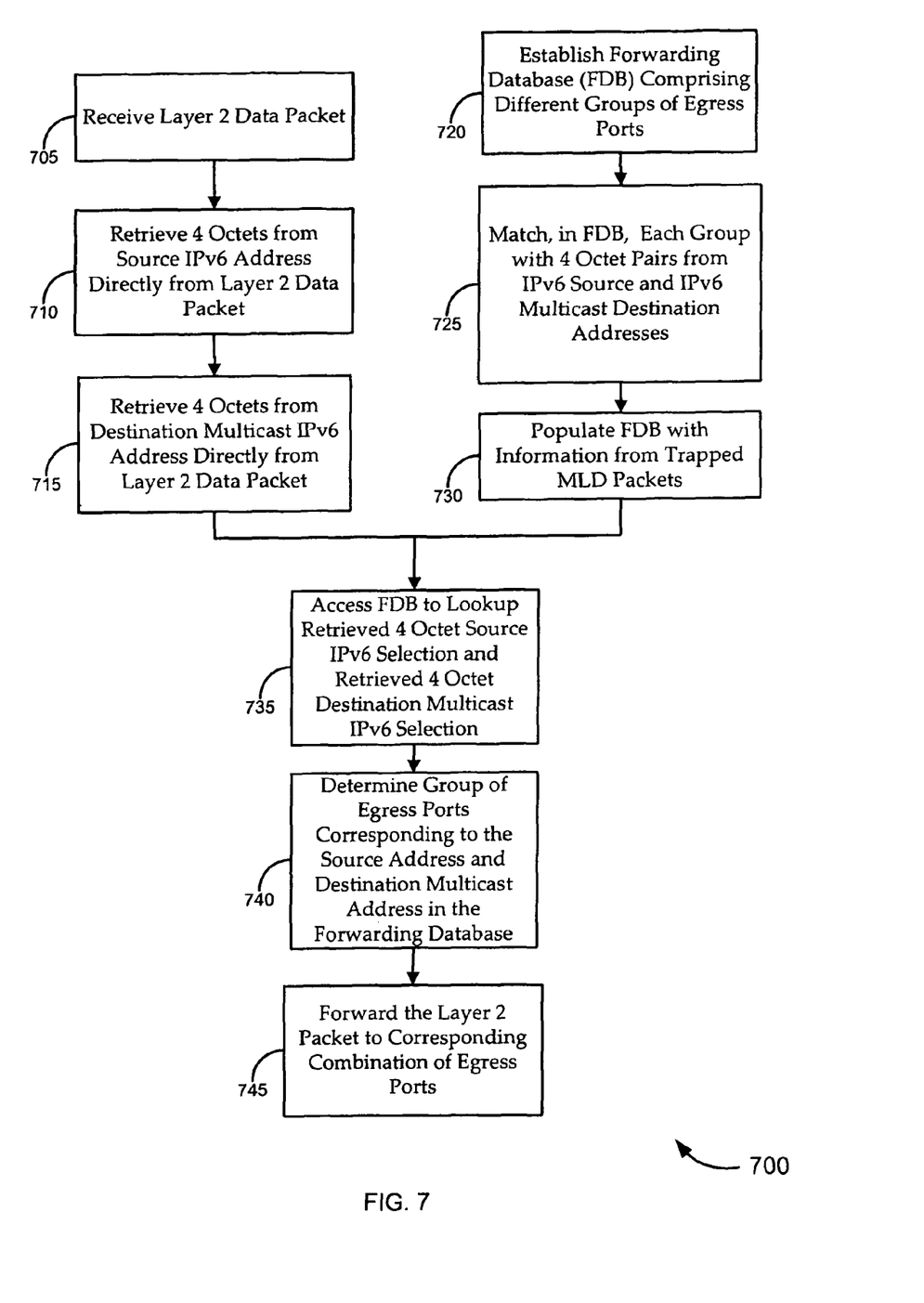
FIG. 7 illustrates a method of forwarding a Layer 2 packet with an IPv6 addressed payload according to various embodiments of the present invention.

FIG. 7 sets forth yet another exemplary embodiment 700 of the invention, illustrating an alternative method of forwarding a received multicast data packet with an IPv6 payload to a subset of egress ports. At block 705, a layer 2 data packet is received. At block 710, four octets from the source IPv6 address are retrieved from the layer 2 data packet. At block 715, four octets from the destination IPv6 multicast address are retrieved from the layer 2 data packet.

At block 720, a forwarding database is established comprising different groups of egress ports. In this embodiment, it is worth noting that the creation of FDB entries is done asynchronously, and in not part of the data path flow. Each group of egress ports is matched, at block 725, with a different pairs of four from IPv6 source and IPv6 multicast destination addresses. At block 730, the forwarding database is populated with additional information from trapped MLD packets.

At block 735, the forwarding database is accessed to lookup the retrieved 4 octets from the source IPv6 address and the retrieved 4 octets from the destination multicast IPv6 address. Based on the lookup, at block 740 a group of egress ports is determined which correspond to the source address and destination multicast address looked up in the forwarding database. At block 745, the layer 2 data packet is forwarded to the determined group of egress ports.

V. CONCLUSION

It should be noted that the methods and devices discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements and protocols are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow chart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure.

Moreover, as disclosed herein, the term "memory region" may represent one or more media for storing data, including read only memory (ROM), random access memory (RAM), magnetic RAM, core memory, magnetic disk storage mediums, optical storage mediums, flash memory devices or other machine readable mediums for storing information. The media may be located in a devise including, but is not limited to, portable or fixed storage devices, storage media, optical storage devices, a sim card, other smart cards, and various other mediums capable of storing, containing or carrying instructions or data.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before the above elements are considered. In addition, reference is made to different functions performed by different units, such as reception, retrieval, accessing, forwarding and replicating being performed by corresponding units in the ingress and egress pipelines. These functions could be performed in any other separate processing units, or some or all could be performed in a single processing unit differently configured by program instructions for each function. Accordingly, the above description should not be taken as limiting the scope of the invention, which is defined in the following claims.

What is claimed is:

1. A method of forwarding a multicast Medium Access Control (MAC) frame through a subset of a plurality of egress ports on a network device, the method comprising:
    specifying, for a plurality of forwarding database entries in a forwarding database, a group of egress ports, a source internet protocol (IP) address, a destination IP multicast address, and a VLAN-ID (Virtual Local Area Network Identifier), the forwarding database accessible by a bridge engine of a MAC bridge, and the bridge engine associated with respective engines corresponding to a plurality of ingress ports and respective engines corresponding to the plurality of egress ports;
    receiving a multicast MAC frame;
    retrieving a source IP address, a destination IP multicast address, and a VLAN-ID from the multicast MAC frame;
    accessing, using the bridge engine, the forwarding database to perform a single lookup based on the retrieved source IP address, the retrieved destination IP multicast address, and the retrieved VLAN-ID to match the retrieved source IP address, the retrieved destination LP multicast address, and the retrieved VLAN-ID with one of the plurality of forwarding database entries to select a corresponding group of egress ports; and
    forwarding the payload of the multicast MAC frame to the corresponding group of egress ports.

2. The method of claim 1, wherein the corresponding group of egress ports comprise a Virtual Area Local Network (VLAN).

3. The method of claim 2, further comprising:
    associating at least one of a plurality of virtual local area network identifiers (VLAN-IDs) with each group of egress ports in the forwarding database,
    wherein the multicast MAC frame further comprises a VLAN-ID of the plurality, the VLAN-ID corresponding to the VLAN.

4. The method of claim 1, further comprising:
    setting a source IP address in the forwarding database to indicate correspondence with any retrieved source addresses.

5. The method of claim 1, further comprising:
    configuring the forwarding database based on information from a plurality of trapped and mirrored messages reporting multicast group information, wherein each of the plurality of egress ports receives at least one message of the plurality.

6. The method of claim 5, further comprising:
    trapping Internet Group Management Protocol (IGMP) report messages received via each of the plurality of egress ports;
    populating the forwarding database based on the IGMP report messages;
    trapping IGMP leave messages received via each of the plurality of egress ports; and
    removing a port from the corresponding group of egress ports based on the IGMP leave messages.

7. The method of claim 5, further comprising:
    trapping Multicast Learner Discovery (MLD) report messages received via each of the plurality of egress ports;
    populating the forwarding database based on the MLD report messages; trapping MLD leave messages received via each of the plurality of egress ports; and
    removing a port from the corresponding group of egress ports based on the MLD leave messages.

8. The method of claim 1, wherein the forwarding step comprises:
    replicating the multicast MAC frame for each port of the group of egress ports; and
    forwarding a replicated multicast MAC frame to each respective port.

9. The method of claim 1, wherein each pairwise combination comprises a sixty-four bit field.

10. The method of claim 9, wherein,
    each pairwise combination comprises a thirty-two bit IP version 4 source address and a thirty-two bit IP version 4 destination multicast address; and
    the retrieved source IP address and the retrieved destination IP multicast address each comprise a thirty-two bit IP version 4 address.

11. The method of claim 9, wherein,
    each pairwise combination comprises a first selection from a 128 bit IP version 6 source address and a second selection from a 128 bit IP version 6 destination multicast address; and
    the retrieved source IP address comprises a selection from a 128 bit IF version 6 address corresponding to the first selection and the retrieved destination IP multicast address comprises a selection from a 128 bit IP version 6 address corresponding to the second selection.

12. The method of claim 11, wherein the first selection comprises a four least significant octets from a 128 bit IP version 6 source address, and the second selection comprises a four least significant octets from a 128 bit IP version 6 destination multicast address.

13. The method of claim 11, further comprising:
configuring the forwarding database to identify a four octet combination for the first thirty-two bit selection and a four octet combination for the second thirty-two bit selection; and
modifying the configuration of the forwarding database to identify a different four octet combination for the first thirty-two bit selection and a different four octet combination for the second thirty-two bit selection.

14. The method of claim 1, wherein the network device comprises a selection from a group consisting of a router, a switch, the MAC bridge, and any combination thereof.

15. The method of claim 1, wherein the network device comprises a single integrated circuit.

16. A method of forwarding a layer 2 multicast data packet to a group of egress ports on a network device, the method comprising:
configuring a forwarding database accessible to a bridge engine of a layer 2 bridge to store a forwarding database entry, the bridge engine associated with respective engines corresponding to a plurality of ingress ports and respective engines corresponding to a plurality of egress ports including the group of egress ports;
specifying, in the forwarding database entry, the group of egress ports, a source address, a destination multicast address, and a VLAN-ID (Virtual Local Area Network Identifier);
retrieving a source address, a destination multicast address, and a VLAN-ID from the layer 2 multicast data packet received by the network device;
accessing, using the bridge engine, the forwarding database to perform a lookup based on the retrieved source address, the retrieved destination multicast address, and the retrieved VLAN-ID to identify the group of egress ports matching the retrieved source address, the retrieved destination multicast address, and the retrieved VLAN-ID; and
forwarding the multicast data packet to the identified group of egress ports.

17. The method of claim 16, further comprising:
configuring the forwarding database to store one or more of a plurality of virtual local area network identifiers (VLAN-IDs) with each group of egress ports stored in the forwarding database,
wherein the layer 2 multicast data packet is associated with a VLAN-ID of the plurality, the VLAN-ID stored with the identified group of egress ports in the forwarding database.

18. The method of claim 16, wherein,
the layer 2 multicast data packet comprises a Medium Access Control (MAC) frame; and
the source address comprises a source Internet Protocol (IP) address and the destination multicast address comprises a multicast destination Internet Protocol (IP) address.

19. An apparatus for forwarding a multicast Medium Access Control (MAC) frame through a subset of a plurality of egress ports, the apparatus comprising:
a forwarding database memory accessible by a bridge engine of a MAC bridge and configured to store a plurality of forwarding database entries, each forwarding database entry comprising a group of egress ports, a source Internet Protocol (IP) address, a destination IP multicast address, and a VLAN-ID (Virtual Local Area Network identifier) corresponding to the VLAN, and the bridge engine associated with respective engines corresponding to a plurality of ingress ports and respective engines corresponding to the plurality of egress ports;
an ingress unit to receive a multicast MAC frame;
a retrieval unit to retrieve a source IP address and a destination IP multicast address from the multicast MAC frame,
an access unit to access, using the bridge engine, the forwarding database memory to lookup one of the plurality of forwarding database entries based on the retrieved source IP address, the retrieved destination IP multicast address, and the VLAN-ID to thereby determine the corresponding group of egress ports; and
an egress unit to forward the multicast MAC frame through the corresponding group of egress ports.

20. The apparatus of claim 19, wherein the corresponding group of egress ports comprise a Virtual Local Area Network (VLAN).

21. The apparatus of claim 20, wherein,
the forwarding database memory is further configured to store at least one of a plurality of virtual local area network identifiers (VLAN-IDs) with each group of egress ports stored in the forwarding database; and
wherein the multicast MAC frame further comprises a VLAN-ID of the plurality, the VLAN-ID corresponding to the VLAN.

22. The apparatus of claim 19, wherein,
the forwarding database memory is further configured to store a source IP address set to zero for one or more of the groups, to indicate correspondence with any retrieved source addresses.

23. The apparatus of claim 19, wherein the forwarding database memory is updated based on information from a plurality of trapped messages reporting multicast group information.

24. The apparatus of claim 23, wherein at least a subset of the plurality of trapped messages comprise Internet Group Management Protocol (IGMP) report messages received via each of the plurality of egress ports used to populate the forwarding database and IGMP leave messages received via each of the plurality of egress ports used to remove a port from the corresponding group of egress ports based on the IGMP leave messages.

25. The apparatus of claim 23, wherein at least a subset of the plurality of trapped messages comprise Multicast Learner Discovery (MLD) report messages received via each of the plurality of egress ports used to populate the forwarding database and MLD leave messages received via each of the plurality of egress ports used to remove a port from the corresponding group of egress ports based on the MLD leave messages.

26. The apparatus of claim 19, further comprising a replication unit to replicate the multicast MAC frame for each port of the corresponding group of egress ports.

27. The apparatus of claim 19, wherein the set of data comprises a sixty-four bit field.

28. The apparatus of claim 27, wherein,
the set of data comprises a thirty-two bit IP version 4 source address and a thirty-two bit IP version 4 destination multicast address; and the retrieved source IP address and the retrieved destination IP multicast address each comprise a thirty-two bit IP version 4 address.

29. The apparatus of claim 27, wherein,
the set of data comprises a first thirty-two bit selection from a 128 bit IP version 6 source address and a second thirty-two bit selection from a 128 bit IP version 6 destination multicast address; and
the retrieved source IP address comprises a thirty-two bit selection from a 128 bit IP version 6 address corresponding to the first thirty-two bit selection and the retrieved destination IP multicast address comprises a thirty-two bit selection from a 128 bit IP version 6 address corresponding to the second thirty-two bit selection.

30. The apparatus of claim 29, wherein the first thirty-two bit selection comprises a four least significant octets from a 128 bit IP version 6 source address, and the second thirty-two bit selection comprises a four least significant octets from a 128 bit IP version 6 destination multicast address.

31. The apparatus of claim 29, wherein,
the forwarding database memory is configurable to identify different four octet combinations for the first thirty-two bit selection and configurable to identify different four octet combinations for the second thirty-two bit selection.

32. The apparatus of claim 19, wherein the apparatus comprises a selection from a group consisting of a router, a switch, the MAC bridge, and any combination thereof.

33. The apparatus of claim 19, wherein the apparatus comprises a single integrated circuit.

34. An apparatus for forwarding multicast packets to a subset of a plurality of egress ports, the apparatus comprising:
a forwarding database memory for lookup of forwarding information for multicast layer 2 packets, the forwarding database configured to store identification of a plurality of forwarding database entries, wherein each forwarding database entry includes a group of egress ports, a source address, a destination multicast address, and a VLAN-ID (Virtual Local Area Network Identifier), the forwarding database at a layer 2 bridge that includes a bridge engine associated with respective engines corresponding to a plurality of ingress ports and respective engines corresponding to the plurality of egress ports;
an ingress unit to receive a multicast layer 2 data packet;
a retrieval unit to retrieve a source address, a destination multicast address, and VLAN-ID from the multicast layer 2 data packet;
an access unit to access, using the bridge engine, the forwarding database memory to lookup one of the plurality of forwarding database entries based on the retrieved source address, the retrieved destination multicast address, and the retrieved VLAN-ID to thereby determine the corresponding group of egress ports; and
an egress unit to forward the multicast layer 2 packet to the corresponding group of egress ports.

35. The apparatus of claim 34, wherein,
the forwarding database memory is further configured to store one or more of a plurality of virtual local area network identifiers (VLAN-IDs) with each group of egress ports stored; and
the layer 2 multicast data packet is associated with a VLAN-ID of the plurality, the VLAN-ID stored with the corresponding group of egress ports in the forwarding database memory.

36. The apparatus of claim 34, wherein,
the multicast layer 2 data packet comprises a multicast Medium Access Control (MAC) frame; and
the source address and the destination multicast address each comprise an Internet Protocol (IP) address.

* * * * *